United States Patent
Coico et al.

(10) Patent No.: US 6,908,025 B2
(45) Date of Patent: Jun. 21, 2005

(54) PREPARING MCM HAT FOR REMOVAL

(75) Inventors: Patrick A. Coico, Fishkill, NY (US); Steven P. Ostrander, Poughkeepsie, NY (US); Sudipta K. Ray, Wappingers Falls, NY (US)

(73) Assignee: Internatioanl Business Machines Corporation, Armonk, NY (US)

( * ) Notice: Subject to any disclaimer, the term of this patent is extended or adjusted under 35 U.S.C. 154(b) by 175 days.

(21) Appl. No.: 10/604,111

(22) Filed: Jun. 26, 2003

(65) Prior Publication Data

US 2004/0262371 A1 Dec. 30, 2004

(51) Int. Cl.[7] ................. B23K 31/02; B23K 1/018; B23K 31/00
(52) U.S. Cl. ............... 228/119; 228/264; 29/426.6; 29/402.08; 29/402.21
(58) Field of Search ................. 228/119, 212, 228/213, 264, 13, 44.3, 44.7, 49.5; 29/402.01–402.08, 403.19, 403.21, 403.3, 403.4, 426.1, 426.6

(56) References Cited

U.S. PATENT DOCUMENTS

| | | | | |
|---|---|---|---|---|
| 5,239,747 A | * | 8/1993 | Ewers | 29/840 |
| 5,461,544 A | * | 10/1995 | Ewers | 361/760 |
| 5,722,579 A | * | 3/1998 | Yu et al. | 228/119 |
| 6,031,729 A | * | 2/2000 | Berkely et al. | 361/771 |
| 6,046,410 A | * | 4/2000 | Wojnarowski et al. | 174/262 |
| 6,492,620 B1 | * | 12/2002 | Lau | 219/209 |

\* cited by examiner

*Primary Examiner*—Colleen P. Cooke
(74) *Attorney, Agent, or Firm*—Lisa U. Jaklitsch; Hoffman, Warnick & D'Alessandro LLC

(57) ABSTRACT

A process and apparatus for preparing an MCM for hat removal where the hat includes a piston thermally coupled to a corresponding chip. The apparatus includes a heater positioned to reflow a joint between the piston and a base of the hat; and a retractor for biasing the piston away from the corresponding chip. Implementation of the apparatus and process prevent a piston, as it moves across the top of a corresponding chip during mechanical shear to remove the hat, to impact chip(s) and surrounding components. In addition, since piston(s) are retracted, the likelihood of piston impact with or cracking of a chip is reduced. In addition, cutting into a corresponding chip having a tilted back surface is prevented. The need to replace chips and other electronic components when making other repairs may, therefore, be greatly reduced.

20 Claims, 3 Drawing Sheets

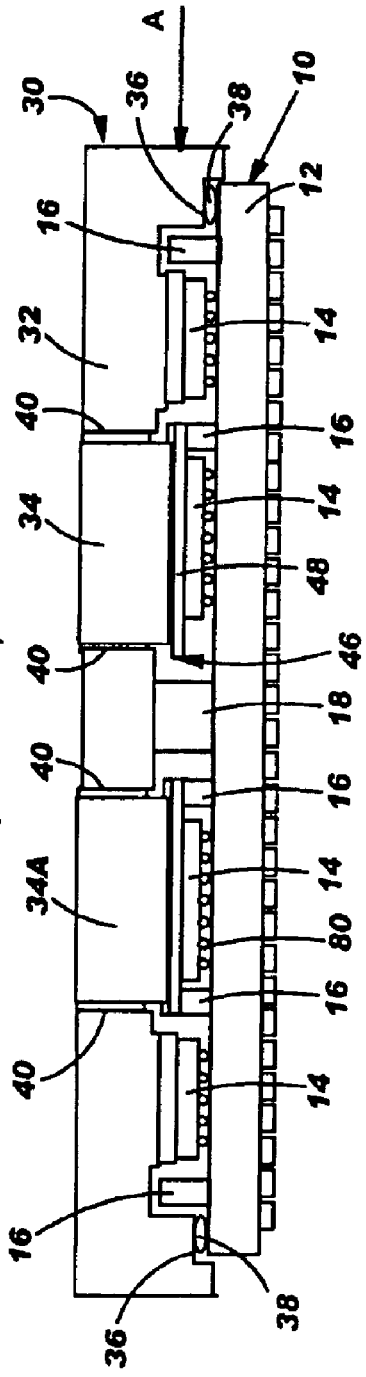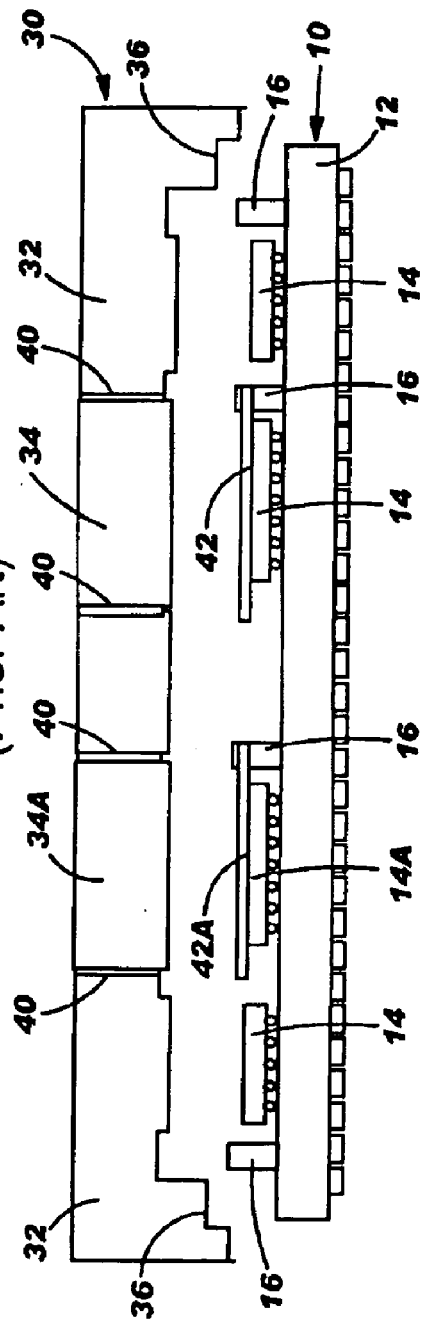

PREPARING MCM HAT FOR REMOVAL

BACKGROUND OF INVENTION

1. Technical Field

The present invention relates generally to a multiple chip module (MCM), and more particularly, to preparation of an MCM hat having a piston for removal.

2. Related Art

Multiple chip modules (MCMs) have been used in high-performance server systems for many years. Referring to FIG. 1, an example MCM 10 is shown. MCM 10 includes a ceramic substrate 12 that carries a number of chips 14 and other electronic components 16, such as capacitors. An MCM 10 may also include a spar 18. Many MCMs also include a cover, referred to as a hat 30, that may be coupled to the rest of the module by screws and a C-ring seal (neither shown). These hats can be easily removed by unfastening the screws, which allows repair of defective chips on the MCMs. Typically, about 10% of MCMs require repair work. Modules with C-ring sealed hats are expensive because the substrate and C-rings are expensive, and the hats require a ground surface for a base plate. The base plate is used to attach the hat to the substrate using fasteners. The substrate requires a ground surface to minimize stresses on the ceramic after the base plate is secured to the ceramic and the substrate is loaded with 1000 to 1200 lb. force required for compressing the C-ring to achieve a good seal.

With continuing reference to FIG. 1, for the next generation of MCMs, a much less expensive sealing technology has been developed in which an epoxy material 38 will be used to seal hat 30. Epoxy material 38 may include, for example, Sylgard® available from DuPont Corporation. With this new sealing technology, repair of MCM 10 requires mechanically shearing off the epoxy material bonded hat. That is, hat 30 is forced (see arrow A) from MCM 10, which can cause damage to electronic components 16 mounted on ceramic substrate 12 because, in many cases, the electrical components 16 (e.g., are higher than an adjacent chip 14. When hat 30 is sheared, a number of components 16 can be removed, necessitating their replacement at significant cost. No processes or mechanisms exist to prevent this damage.

Additional damage from mechanical shear is expected from multiple-part hats, which have been developed to aid thermal dissipation. The illustrative MCM 10 shown in FIG. 1 includes one example of a multiple-part hat 30. Hat 30 includes a base 32 and at least one piston 34. Base 32 includes a sealing ledge 36 for receiving epoxy material 38, which seals hat 30 to MCM 10. Each piston 34 is held in place within base 32 by a piston joint 40. As shown in FIG. 3, in one example, each piston is substantially cylindrical shaped, and each piston joint 40 includes an annulus about a respective piston 34. Piston joint 40 may include any of a variety of materials to hold piston 34 in place relative to base 32. In one example, piston joint 40 includes a solder such as eutectic Sn/Pb, Sn/Ag, Sn/Bi, Sn/Ag/Cu, typically with a solder melting point between 150 Â° C. to 221 Â° C. During set up of MCM 10, hats 30 are reflowed with a biasing force (not shown) to make each piston, e.g., piston 34A shown in FIG. 2, move toward a back surface 42A (FIG. 2) of a corresponding chip 14A to achieve a controlled chip-to-piston gap 46 (FIG. 1). Chip-to-piston gap 46 is filled with a thermal interface material 48 such as advanced thermal compound (ATC) paste, oil or phase change material (PCM). In this fashion, each piston 34 attains a better thermal coupling to a corresponding chip 14 regardless of whether a back surface 42 of chip 14 is parallel with base 32 of hat 30, and regardless of the height of a corresponding chip 14. Chip-to-piston gap 46 may be approximately in the 50 Î¼ m to Î¾ m range for ATC paste, and 3 Î¼ m to 20 Î¼ m for oil or PCM.

Mechanical shear of the above-described multiple-part hat 30 can cause more damage than a non-multiple-part hat. In particular, since a piston 34 may be positioned in a non-planar fashion relative to base 32, piston 34 may move across the top of a corresponding chip 14 and impact a number of adjacent electrical components 16, necessitating replacement of the electrical components. In addition, despite the presence of chip-to-piston gap 46, a piston(s) 34 may also cut into a corresponding chip 14 that has a tilted back surface 42 during mechanical shear of hat 30. As a result, when a piston 34 moves, it may also cause severe damage to a chip(s) 14. Replacement of chips 14 during repair adds significantly to repair costs. Again, no processes or mechanisms exist to prevent this damage.

Damage in the form of undetected microscopic cracks in a chip 14 caused by mechanical shear presents another problem. In particular, a microscopic crack that goes undetected may grow under land grid array (LGA) loading, and cause unexpected device failure during machine life. As a result, the mechanical shear approach to removing a hat may necessitate further repairs and expense.

In view of the foregoing, there is a need for a way to prepare an MCM hat for removal that does not suffer from the problems of the related art.

SUMMARY OF INVENTION

The invention includes a process and apparatus for preparing an MCM for hat removal where the hat includes a piston thermally coupled to a corresponding chip. The apparatus includes a heater positioned to reflow a solder joint between the piston and a base of the hat; and a retractor for biasing the piston away from the corresponding chip. Implementation of the apparatus and process prevent a piston form impacting a chip(s) and surrounding components as it moves across the top of a corresponding chip during mechanical shear to remove the hat. In addition, since piston(s) are retracted, the likelihood of piston impact with, or cracking of, a chip is reduced. Further, cutting into a corresponding chip having a tilted back surface is prevented. The need to replace chips and other electronic components when making other repairs may, therefore, be greatly reduced.

A first aspect of the invention is directed to a method of preparing a multiple chip module (MCM) hat for removal from the MCM, the hat including a base and a piston thermally coupled to a chip and joined to the base by a piston joint, the method comprising the steps of: applying a force to the piston in a direction away from the chip; and heating to reflow the piston joint such that the piston retracts from the chip.

A second aspect of the invention is directed to an apparatus for preparing a multiple chip module (MCM) for hat removal where the hat includes a piston thermally coupled to a chip, the apparatus comprising: a heater positioned to reflow a joint between the piston and a base of the hat; and a retractor for biasing the piston away from the corresponding chip.

A third aspect of the invention is directed to an apparatus for preparing a multiple chip module (MCM) for hat removal, the hat including a base and a piston thermally coupled to a chip and joined to the base by a piston joint, the apparatus comprising: means for biasing the piston away from the chip; and means for heating the piston joint to allow the piston to move away from the chip.

The foregoing and other features of the invention will be apparent from the following more particular description of embodiments of the invention.

BRIEF DESCRIPTION OF DRAWINGS

The embodiments of this invention will be described in detail, with reference to the following figures, wherein like designations denote like elements, and wherein:

FIG. 1 shows a prior art MCM.

FIG. 2 shows a prior art MCM with a hat thereof removed.

DETAILED DESCRIPTION

Figure 3:
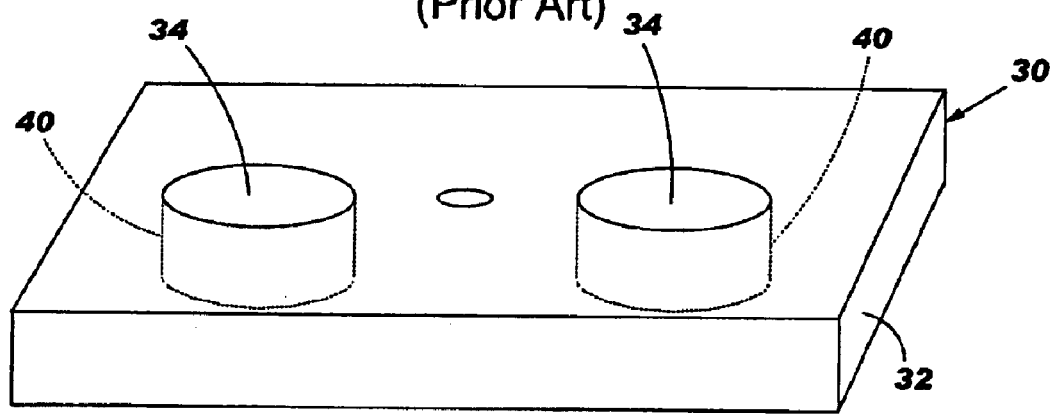
FIG. 3 shows a detail of one embodiment of a prior art hat.
Figure 4:
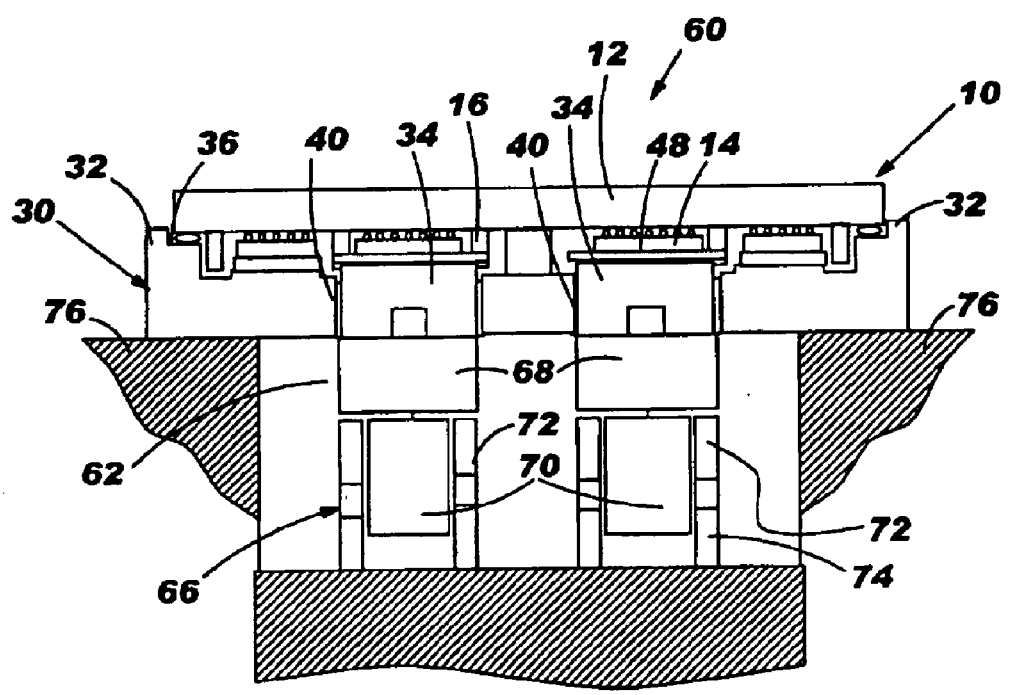
FIG. 4 shows an apparatus for preparing an MCM for hat removal.

Referring to FIG. 4, in order to prevent damage caused by mechanical shear of a hat 30 from a ceramic substrate 12 during removal, the invention includes a process and an apparatus 60 for preparing MCM 10 for hat 30 removal. Apparatus 60 includes a heater positioned to reflow a piston joint 40 between piston 34 and a base 32 of hat 30; and a retractor 66 for biasing piston 34 away from a corresponding chip 14. In one embodiment, heater 62 may include a heating element 68 for one or more pistons 34 of substantially the same shape as piston joint 40. Heater 62 is positioned to expose each desired piston joint 40 to enough heat to cause the piston joint material, e.g., solder, to reflow. For example, heating element 68 may be circular or cylindrical such that its heating source matches a pivot joint 40 having a circular shape such as the annulus shown in FIG. 3. Heating element 68 may take the form of any now known or later developed device for providing localized heat such as an electric heating element. In one embodiment, heater 62 may be coupled to piston 34 (e.g., by screws or another fastener) for retraction therewith, but this may not be necessary in all cases.

Retractor 66 includes some sort of biasing force coupled to piston 34 to urge the piston away from a corresponding chip 14. In one embodiment, retractor 66 includes a spring biasing device 70 or a weight 70 coupled to piston 34. It should be recognized that retractor 66 may include any now known or later developed mechanism for applying a force to piston 34. Retractor 66 may also include a piston travel stop 72 to set a retraction distance of piston 34. Piston travel stop 72 may be any mechanism capable of stopping the retraction of piston 34 from a corresponding chip 14, and may be adjustable to accommodate different MCMs 10. For example, as shown in FIG. 4, piston travel stop 72 may include a telescoping arm 74.

Apparatus 60 may also include a support 76 for base 32 of hat 30, i.e., for MCM 10. As shown in FIG. 4, where hat 30 includes a plurality of pistons 34, apparatus 60 may include a heater 62 positioned to reflow a piston joint 40 between each piston 34 and base 32 of hat 30, and a retractor 66 for each piston 34.

In operation, a force is applied to one or more pistons 34 by retractor 66 in a direction away from a corresponding chip 14, and heating to reflow piston joint 40 such that piston 34 retracts from corresponding chip 14. Heat may be applied generally or in a more localized fashion to piston joint 40. As noted above, the force may be applied as a spring force, as a weight force or via any other mechanism to piston 34. The method may also include steps for removing hat 30 from MCM 10 by applying a shearing force. The removing step may also include applying a torque to remove a spar 18 of MCM 10, removing thermal interface material 48 from piston 34 and chip 14, and removing epoxy material 38 used to bond hat 30 to ceramic substrate 12 of MCM 10.

In terms of heating temperature, referring to FIG. 1, chips 14 used in high-performance MCM 10 currently utilize a high-melting point lead (Pb) based solder, e.g., Pb-97%/Sn-3%, with a melting point ("mp") of, e.g., approximately 320 Â° C., for a series of solder bumps 80. During assembly and preparation for removal of hat 30, it is preferred that solder bumps 80 on chips 14 do not melt. Non-melting of solder bumps 80 is desirable during assembly of hat 30 to substrate 12, so the weight of each piston 34, 34A can be supported by a corresponding chip 14. During preparation for removal of hat 30, non-melting of solder bumps 80 is advisable so that shorts do not result among solder bumps 80 on a chip 14, which make MCM 10 a defective product.

Provision for non-melting of solder bumps 80 requires a melting point differential between the solder used for solder bumps 80, and that used for piston joints 40. In one embodiment, the melting point differential is at least 60 Â° C., and preferably between 80 Â° C. to 100 Â° C., with the melting point of solder bumps 80 being higher. In one embodiment, for high lead (Pb) content solder bumps 80 (mp: ~320 Â° C.), a preferred melting point for a piston joint 40 is between 170 Â° C. to 250 Â° C. Where solder bumps 80 include a lead-based solder, illustrative solder to be used for a piston joint 40 may include: eutectic Sn/Pb (mp: 183 Â° C.), eutectic Sn/Ag (Sn-96.5%, balance Ag, mp: 221 Â° C.), Sn/Ag/Cu (Ag-3.8%/Cu-0.9%, balance Sn, mp: 217 Â° C.). In one example, for the Pb-97%/Sn-3% solder bumps 80 described above, piston joint 40 solder can be a eutectic Sn/Pb (e.g., Sn-63%/Pb-37%) with a melting point of approximately 183 Â° C. This selection provides a wide melting point differential between piston joint(s) 40 and solder bumps 80 (mp: ~320 Â° C.) during preparation of hat 30 for removal. In this case, heating by heating element 68 may occur at a temperature, for example, between 200–220 Â° C. As a result, solder bumps 80 do not melt. Heating element 68 is configured to maintain the temperature differential, i.e., maintain an appropriate temperature to melt a piston joints 40 but not solder bumps 80.

It should be recognized that the above listed solder joint 40 and solder bump 80 material may vary. For example, a general trend in the microelectronics industry is to eliminate lead (Pb) from electronic devices and interconnections in the near future. Currently, some lead-free solders to be used for solder bumps include, for example, Sn/Ag or Sn/Ag/Cu, which have a melting point of approximately 220 Â° C. For lead-free hats 30, the melting point of solder joints 40 is preferably between approximately 115 Â° C. to approximately 150 Â° C. Illustrative lead-free solders for piston joint 40 may include: Sn/In (50/50, mp: 127 Â° C.) or Sn/Bi (42/58, mp: 139 Â° C.). Other lead-free alloys that have good wetting properties to hats 30 (typically including Cu or Cu-alloys) and melting points in the above range can also be used.

Implementation of the above-described apparatus and process prevents a piston 34, as it moves across the top of a corresponding chip during mechanical shear to remove hat 30, to impact chip(s) 14 and surrounding component(s) 16. In addition, since piston(s) 34 are retracted, the likelihood of piston impact with, or cracking of, a chip 14 is reduced. In addition, cutting into a corresponding chip 14 having a tilted back surface 42 is prevented. The need to replace chips and other electronic components when making other repairs may, therefore, be greatly reduced.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims. For example, while MCM 10 is shown in an inverted position relative to apparatus 60, it should be recognized that apparatus 60 may be provided with mechanisms, e.g., a retractor 66, that does not require MCM inversion.

What is claimed is:

1. A method of preparing a multiple chip module (MCM) hat for removal from the MCM, the hat including a base and a piston thermally coupled to a chip and joined to the base by a piston joint, the method comprising the steps of:

applying a force to the piston in a direction away from the chip; and heating to reflow the piston joint such that the piston retracts from the chip.

2. The method of claim 1, further comprising the step of removing the hat from the MCM by applying a shearing force.

3. The method of claim 2, wherein the removing step includes removing an epoxy material used to bond the hat to a substrate of the MCM.

4. The method of claim 1, wherein the heating step includes maintaining a temperature that will reflow the piston joint, but not a solder bump used to mount the chip.

5. The method of claim 4, wherein a difference between a melting point of the piston joint and the solder bump is at least 60 Â° C.

6. The method of claim 1, wherein the applying force includes applying one of a spring force and a weight force to the piston.

7. The method of claim 1, wherein the heating step includes heating the piston joint.

8. The method of claim 1, further comprising the step of setting a piston retraction distance.

9. An apparatus for preparing a multiple chip module (MCM) for hat removal where the hat includes a piston thermally coupled to a chip, the apparatus comprising:

a heater positioned to reflow a joint between the piston and a base of the hat; and a retractor for biasing the piston away from the corresponding chip.

10. The apparatus of claim 9, wherein the heater includes a heating element of a substantially same shape as the joint.

11. The apparatus of claim 9, wherein the heater is coupled to the piston.

12. The apparatus of claim 9, wherein the joint includes a solder.

13. The apparatus of claim 9, wherein the piston is substantially cylindrical, and the joint includes an annulus about the piston.

14. The apparatus of claim 9, wherein the retractor includes one of: a spring biasing device coupled to the piston, and a weight coupled to the piston.

15. The apparatus of claim 9, wherein the retractor includes a piston travel stop to set a retraction distance of the piston.

16. The apparatus of claim 9, further comprising a support for the base of the hat.

17. The apparatus of claim 9, wherein the hat includes a plurality of pistons, the apparatus further comprising a heater positioned to reflow the joint between each piston and a base of the hat; and a retractor for each piston.

18. The apparatus of claim 9, wherein the heating element maintains a temperature that will reflow the joint, but not a solder bump used to mount the chip.

19. The apparatus of claim 9, wherein a difference between a melting point of the joint and the solder bump is at least 60 Â° C.

20. An apparatus for preparing a multiple chip module (MCM) for hat removal, the hat including a base and a piston thermally coupled to a chip and joined to the base by a piston joint, the apparatus comprising:

means for biasing the piston away from the chip; and means for heating the piston joint to allow the piston to move away from the chip.

* * * * *

UNITED STATES PATENT AND TRADEMARK OFFICE
CERTIFICATE OF CORRECTION

PATENT NO. : 6,908,025 B2
DATED : June 21, 2005
INVENTOR(S) : Coico et al.

It is certified that error appears in the above-identified patent and that said Letters Patent is hereby corrected as shown below:

Title page,
Item [73], Assignee, please replace "Internatioanl" with -- International --.

Signed and Sealed this

Thirteenth Day of September, 2005

JON W. DUDAS
*Director of the United States Patent and Trademark Office*